Sept. 2, 1969  H. K. SCHMIDT  3,464,747
SELF-ALIGNING PLAIN BEARING
Filed March 12, 1968  2 Sheets-Sheet 1
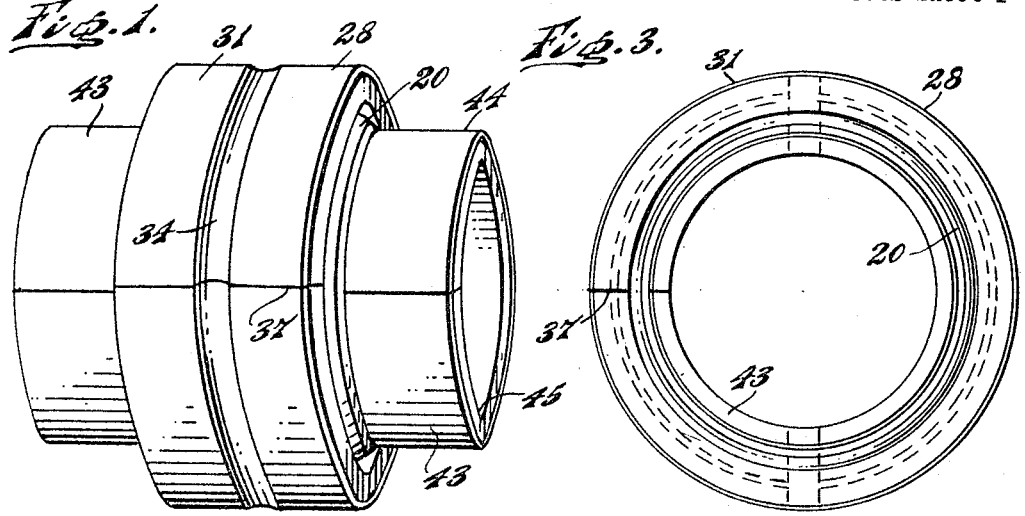
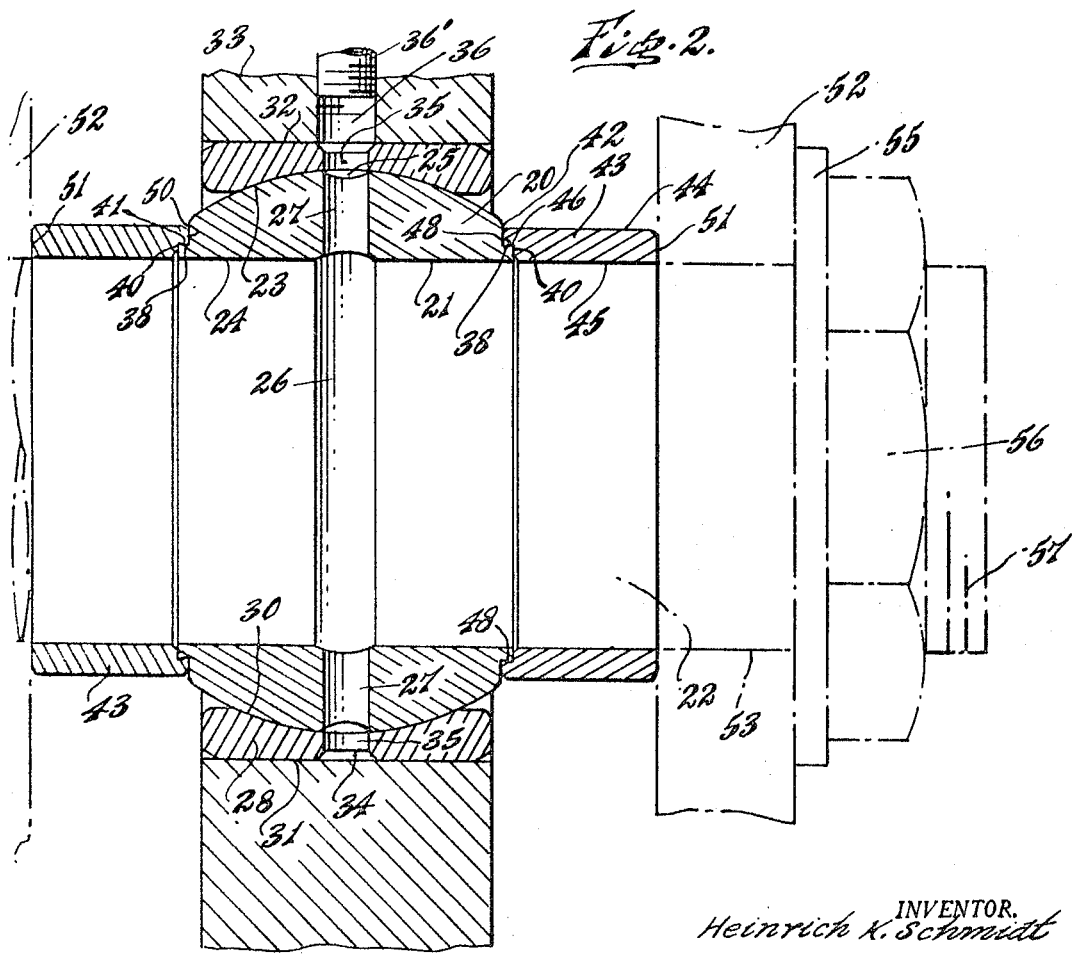
INVENTOR.
Heinrich K. Schmidt
BY
ATTORNEYS

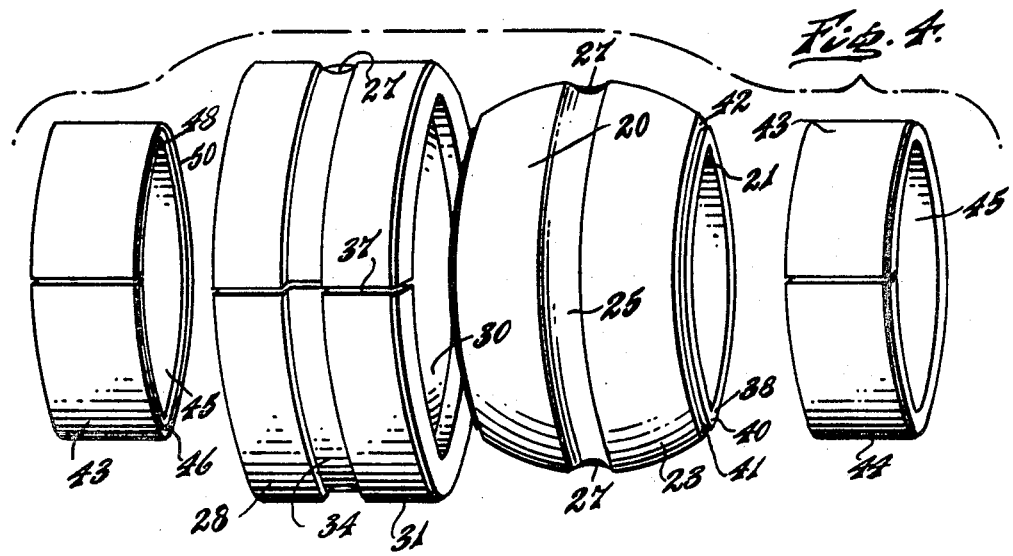
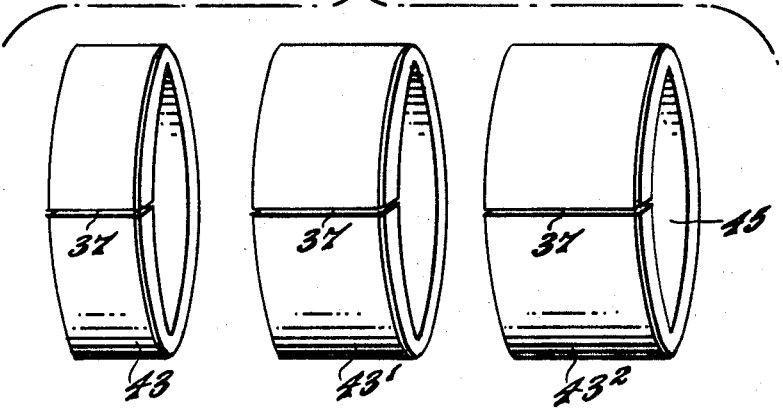
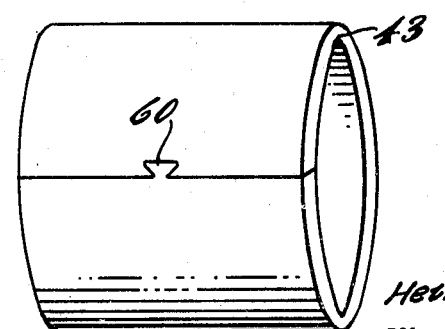

United States Patent Office 3,464,747
Patented Sept. 2, 1969

3,464,747
SELF-ALIGNING PLAIN BEARING
Heinrich K. Schmidt, Levittown, Pa., assignor to Roller Bearing Company of America, West Trenton, N.J., a corporation of New Jersey
Filed Mar. 12, 1968, Ser. No. 716,268
Int. Cl. F16c 9/06, 23/00, 25/00
U.S. Cl. 308—72                              2 Claims

ABSTRACT OF THE DISCLOSURE

The invention relates to an improved self-aligning plain bearing of the type which has a spherical inner race cooperating with a spherical outer race, the spherical inner race or ball having at one or both ends an annular interlock which can be engaged by a cooperating interlock on a tubular extension. To provide sufficient compliance to engage and disengage the interlock on the extension, the extension is split at a point around the circumference and is resiliently deflectable.

---

The present invention relates to self-aligning plain bearings.

A purpose of the invention is to permit change of extensions on the ball of a self-aligning plain bearing by engaging or disengaging interlocks between the end of the ball and the cooperating end of a tubular extension.

A further purpose is to simplify manufacturing and warehousing problems in self-aligning plain bearings by permitting the construction of a set of different extensions of suitably different lengths, any one of which can be supplied with a particular self-aligning plain bearing without the necessity to manufacture a different ball depending on the length of the extension.

A further purpose is to spring an elastically deflectable extension radially outwardly to engage or disengage with an interlock on the ball of the self-aligning plain bearing and to allow the extension to contract radially under its internal springiness to grip the interlock on the ball.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a perspective of a self-aligning plain bearing according to the invention provided with detachable extensions at both ends of the ball.

FIGURE 2 is an axial section of a self-aligning plain bearing according to the invention assembled in a typical installation.

FIGURE 3 is an end view of the self-aligning plain bearing shown in FIGURE 2, omitting other parts.

FIGURE 4 is an exploded perspective of the self-aligning plain bearing of FIGURES 1 to 3.

FIGURE 5 is a perspective showing a set of extensions of different lengths, any one of which can be snapped into place to fit a particular self-aligning plain bearing.

FIGURE 6 is a perspective of a modified form of extension of the invention.

Self-aligning plain bearings are widely used, especially for heavily loaded parts subjected to intermittent motion where misalignment is likely to be encountered. One type of application is one in which there is a combination of rotation and also misalignment requiring a spherical bearing. Another type of application for self-aligning plain bearings is in installations in which there is likelihood of improper alignment of the bearing in inital setup. Another type of application for self-aligning plain bearings is where one or more parts are subject to internal stress that may cause distortion, for example, from welding stresses, casting stresses, heat treating stresses, or the like. Another type of installation is one in which components may change their relationship during service either from accident damage, wear or otherwise.

Self-aligning plain bearings have been constructed in the past in various ways, and it is contemplated that the bearing of the present invention may be similarly constructed. One manner of construction, using hardened steel parts, has been to make the ball and the socket separately and to crack the socket at two spaced points around the circumference so that it can be readily assembled on the ball. Another method of construction which is favored for making the bearing of the present invention is to make the ball and the socket of hardened steel parts and to crack the socket at one circumferential point and then elastically deflect it outwardly, slip it over the ball and then allow it to release and assume its assembled relationship with the ball due to its springiness. U.S. Patent No. 3,127,664, granted to Zurick, Apr. 7, 1964, for Method for Fracturing of Ball and Socket Bearings. In either of these cases it will be evident that the socket is held in its proper position by a housing which engages it in service.

Another method of assembling a self-aligning plain bearing is to manufacture the socket with sufficient clearance so that it can be slipped over the ball, and use metal for the socket that has adequate ductility to permit swaging the socket until it conforms to the ball. Another method of manufacture is to manufacture the socket with adequate clearance to be fitted around the ball and to insert end fillers in the socket to make it conform spherically to the ball.

Very frequently it is necessary in installing a self-aligning plain bearing to provide tubular extensions, spacers or fillers which will surround the shaft and space the ball in the desired position axially. Originally these were handled as separate components, but this was troublesome both from the standpoint of possible loss of parts and also because of the difficulty in assembling from loose parts which were likely to become misaligned.

Because of this difficulty in the prior art, it has become common to manufacture the ball with extensions integral with it and extending from its ends. This form, however, despite the advantages afforded by the integral construction, has shortcomings.

In the first place since the outside diameter of the ball is considerably greater than the outside diameter of the extensions, this has necessitated wasteful machining away of material in order to make the combination of the ball and the extensions. A further shortcoming has been caused by the fact that the demand by customers is for various lengths of extensions to fit a certain shaft. Either the bearing manufacturer, therefore, must make up the self-aligning plain bearings for the same shaft size with numerous lengths of extensions, or he must manufacture each socket as a special item to fit the customer's demands as to extension length, losing the advantage of large production runs in the machine shop. This, of course, has resulted in making the self-aligning plain bearings with extensions comparatively expensive to supply.

The present inventor has discovered that it is possible to obtain the advantage of interconnection between the ball and the extensions, so that the entire bearing can be shipped and installed as one unit without separate parts, and at the same time provide means for interconnecting various lengths of extensions on either or both ends of the ball, while the uniform balls, of a certain ball size, can be made in larger production runs or the balls may be made from stock items by machining the interlocks at the ends.

For this purpose the ball is provided with an interlock at one or both ends. Each of the extensions is provided with a cooperating interlock at one end. The extensions are split at a point around the circumference so that they can be elastically deflected outward to slip over the interlock on the ball and then can engage the interlock on the ball by springing inwardly due to their springiness. If a particular self-aligning plain bearing in stock is equipped with the wrong lengths of extensions, it is merely necessary to detach them by expanding the extensions outwardly so that they can be slipped off the interlocks and then to similarly reengage the interlocks of other extensions.

Thus a feature of interchangeability is introduced which was not heretofore possible and a warehouse or jobber can be supplied with the basic self-aligning plain bearing of a particular shaft size and with a set of interlocks of different lengths for that shaft size and he can use any interlock on any bearing of that particular ball size.

It will also be evident that while it is preferred in the invention to employ heat treated hardened steel parts, for example, of a suitable spring bearing such as AISI 52100 for the extensions, it will be understood that a choice of different procedures is made possible. For instance, the extensions may be rolled butt-tight from strip stock of cold rolled steel, eventually with subsequent hardening, or of any suitable nonferrous material such as bronze.

As shown in the drawings, the self-aligning plain bearing of the invention comprises a ball 20 having an interior bore 21 to engage a shaft 22, the ball normally being slip fitted on the shaft as in usual practice. The detail of construction of the ball is not critical in the present invention but a preferred form as illustrated has spherical outer surfaces 23, a cylindrical inner surface 24 engaging the shaft, a center lubrication groove 25 in the outer surface extending around the circumference, a center lubrication groove 26 in the inner surface extending around the circumference and lubrication holes 27 connecting the same.

The ball is surrounded and engaged by a spherical socket 28 having an inner spherical surface 30 engaging the outer spherical surface 23 on the ball and having an outer cylindrical surface 31 which is suitably pressed within a cylindrical bore 32 of a housing 33 which will conveniently be a machine element.

The outer cylindrical surface of the outer race has a circumferential center lubrication groove 34 and is provided with lubrication openings 35 which connect with the lubrication groove 25 on the outside spherical surface of the ball.

Any suitable lubrication opening 36 extends through the housing to communicate with the lubrication groove 34 on the socket and the lubrication opening 36 may admit lubrication through a lubrication fitting 36' as well known.

As a matter of convenience in assembly, the socket 28 is desirably broken or split at one circumferential point 37 so that the socket can be sprung outwardly for assembly on the ball. The break or split 37 shown across the circumferential ends will not be needed if some other method of assembly is used or in a particular installation two breaks or splits may be employed at suitably opposite points if desired.

One or preferably both ends of the ball are provided with annular interlocks 38, the interlocks conveniently being of general Z-formation having an end portion 40 transverse to the axis, and an outwardly coning surface 41 extending from the end portion 40 toward a shoulder 42 suitably transverse to the axis.

At one or both ends of the ball there is provided a tubular extension 43 having a cylindrical outside surface 44 and an inner bore 45 of a size to make a slide fit on the shaft 22. Interlocks at the adjoining ends of the extensions are provided at 46 and these are conveniently opposite counterparts of the interlocks on the ends of the ball. They have near the interior surfaces 50 transverse to the axis, an inwardly coning surface 48 which is adapted to firmly engage the outwardly coning surface 41 on the ball and then at the end a portion 50 which is at right angles to the axis.

Thus it will be evident that the extensions as shown in FIGURE 2 engage at the opposite remote ends 51 the interior portions of supporting arms 52 holding them in spaced relation. The arms 52 have holes 53 through which the shaft 22 extends and at the outside the shaft may be held in any suitable way, as for example by a head (not shown) on one end and a washer 55 and nut 56 at the other end engaging a thread 57 on the shaft.

It will, of course, be understood that various relations of the bearing with respect to the shaft and housing will be used depending on whether the bearing is employed for one piece of machinery or for another. For example, if the bearing of the invention is employed on a rod end, a modified configuration will be used as well known.

FIGURE 5 shows three different lengths of extensions, 43, 43' and $43^2$ which can be substituted interchangeably on the ends of the ball by expanding them at the split portions 37 so that they will interlock with the appropriate interlock on the ball.

In some cases it may be desirable to interlock the circumferential ends of the extension by a dog ear 60 as shown in FIGURE 6. This is best suited for use with a soft material to hold the ends of the extension together.

In view of my invention and disclosure, variations and modifications to meet individual whim or particular need will doubless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A self-aligning plain bearing comprising a ball provided with a bore from end to end and having an annular interlock at one end, a spherical socket surrounding and engaging the ball, and a sapcer comprising tubular extension having an opening therethrough cooperating with the bore through the ball and having an annular interlock coopearting with the interlock on the ball, the extension being resilient and split to spring into engagement with the interlock on the ball.

2. A self-aligning plain bearing having a ball provided with a bore extending from end to end and having annular interlocks at the ends of the balls, a spherical socket surrounding and engaging the ball, and spacers comprising split tubular extensions having annular interlocks each at one end in coopeartive engagement with the interlocks at the ends of the ball, the extensions being removable from the socket by detaching the interlocks.

References Cited

UNITED STATES PATENTS

| | | | |
|---|---|---|---|
| 1,510,806 | 10/1924 | Snider | 308—36.1 |
| 2,740,676 | 4/1956 | Potter | 308—236 |
| 3,198,563 | 8/1965 | Steidl | 308—72 |
| 3,240,502 | 3/1966 | Snyder. | |
| 3,347,577 | 10/1967 | Carlson | 308—72 X |

FOREIGN PATENTS 390,893  4/1933  Great Britain.

MARTIN P. SCHWADRON, Primary Examiner

L. L. JOHNSON, Assistant Examiner

U.S. Cl. X.R.

287—100, 88